(12) United States Patent
Eberle et al.

(10) Patent No.: US 9,248,864 B2
(45) Date of Patent: Feb. 2, 2016

(54) BODY STRUCTURE HAVING A ROOF RAIL

(71) Applicant: Dr. Ing. h.c. F. Porsche Aktiengesellschaft, Stuttgart (DE)

(72) Inventors: Wilfried Eberle, Ehingen (DE); Ruediger Jahn, Schwieberdingen (DE); Anika Siee, Korntal-Muenchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/546,057

(22) Filed: Nov. 18, 2014

(65) Prior Publication Data

US 2015/0137563 A1     May 21, 2015

(30) Foreign Application Priority Data

Nov. 19, 2013 (DE) .......................... 10 2013 112 779
Apr. 7, 2014 (DE) .......................... 10 2014 104 920

(51) Int. Cl.
    *B60R 9/04*     (2006.01)
    *B60R 9/058*     (2006.01)
    *B62D 25/06*     (2006.01)
    *B60R 13/06*     (2006.01)

(52) U.S. Cl.
    CPC . *B62D 25/06* (2013.01); *B60R 9/04* (2013.01); *B60R 9/058* (2013.01); *B60R 13/06* (2013.01)

(58) Field of Classification Search
    CPC .......... B60R 9/04; B60R 9/058; B62D 25/06
    USPC ..................... 296/37.7, 210, 193.12, 187.13; 224/309, 325, 326
    See application file for complete search history.

(56) References Cited

U.S. PATENT DOCUMENTS

| | | | | |
|---|---|---|---|---|
| 4,475,765 A | * | 10/1984 | Vogt ....................... | B62D 25/06 296/210 |
| 4,834,448 A | * | 5/1989 | Sakamoto .............. | B62D 25/06 224/309 |
| 6,592,176 B2 | * | 7/2003 | Lumpe .................. | B62D 25/06 224/309 |

(Continued)

FOREIGN PATENT DOCUMENTS

| | | |
|---|---|---|
| DE | 195 33 157 | 3/1996 |
| DE | 195 42 109 | 5/1996 |

(Continued)

OTHER PUBLICATIONS

German Search Report of Oct. 7, 2014.

*Primary Examiner* — Gregory Blankenship
(74) *Attorney, Agent, or Firm* — Gerald E. Hespos; Michael J. Porco; Matthew T. Hespos

(57) ABSTRACT

A body structure of a motor vehicle, having a side part, having a vehicle roof, having a fastening device which acts on an underside of the vehicle roof, and having a roof rail which is mounted on an upper side of the vehicle roof via a plurality of mounting elements, a plurality of hollow rivets extending through the fastening device, which is configured as a reinforcing element for the vehicle roof, and the vehicle roof, and the roof rail being fastened to the upper side of the vehicle roof via the mounting elements in such a way that a threaded section of each mounting element extends through in each case one of the hollow rivets and protrudes out of the respective hollow rivet, a nut acting on that threaded section of the respective mounting element which protrudes out of the hollow rivet.

20 Claims, 14 Drawing Sheets

(56) References Cited

U.S. PATENT DOCUMENTS

| | | | | |
|---|---|---|---|---|
| 6,616,221 B2* | 9/2003 | Lumpe | ................... | B60R 9/04 224/309 |
| 6,715,822 B2* | 4/2004 | Lumpe | ................... | B62D 25/06 296/210 |
| 6,902,229 B2* | 6/2005 | Bradbrook | ................... | B60R 9/04 224/309 |
| 7,055,882 B2* | 6/2006 | Santaolalla | ................... | B60R 7/04 224/311 |
| 8,056,783 B2* | 11/2011 | Hirano | ................... | B60R 9/04 224/309 |
| 8,979,181 B2* | 3/2015 | Slack | ................... | B60R 13/04 296/210 |
| 2005/0082880 A1* | 4/2005 | Lee | ................... | B62D 29/043 296/210 |
| 2006/0226188 A1* | 10/2006 | Smith | ................... | B60R 9/04 224/326 |
| 2007/0194069 A1* | 8/2007 | Binder | ................... | B60R 9/04 224/326 |
| 2008/0099519 A1* | 5/2008 | Binder | ................... | B60R 9/04 224/309 |
| 2009/0102241 A1* | 4/2009 | Harberts | ................... | B60R 13/04 296/213 |
| 2009/0145941 A1* | 6/2009 | Kiyota | ................... | B60R 9/04 224/326 |
| 2009/0152903 A1* | 6/2009 | Fuchs | ................... | B62D 25/07 296/210 |
| 2014/0227060 A1* | 8/2014 | Figge | ................... | F16B 5/0233 411/384 |
| 2015/0122857 A1* | 5/2015 | Ferman | ................... | B60R 9/058 224/309 |
| 2015/0137563 A1* | 5/2015 | Eberle | ................... | B60R 9/04 296/215 |
| 2015/0180178 A1* | 6/2015 | Ranka | ................... | B60R 9/058 403/299 |

FOREIGN PATENT DOCUMENTS

| | | |
|---|---|---|
| DE | 196 40 753 | 4/1997 |
| DE | 103 49 704 | 6/2005 |
| DE | 20 2006 004 138 | 6/2006 |
| EP | 1 712 419 | 10/2006 |
| JP | 9-207681 | 8/1997 |

* cited by examiner

BODY STRUCTURE HAVING A ROOF RAIL

CROSS REFERENCE TO RELATED APPLICATION

This application claims priority under 35 USC 119 to German Patent Appl. No. 10 2013 112 779.7 filed on Nov. 19, 2013 and DE 10 2014 104 920.9 filed on Apr. 7, 2014, the entire disclosures of which are incorporated herein by reference.

BACKGROUND

1. Field of the Invention

The invention relates to a body structure having a roof rail.

2. Description of the Related Art

EP 1 712 419 B1 discloses a body structure having a roof rail. According to the prior art, the body structure comprises an assembled side part having an outer side part, a central side part, an inner side part, and a vehicle roof adjoining the assembled side part. A fastening device acts on an underside of the vehicle roof, whereas the roof rail is fastened to the upper side of the vehicle roof via a plurality of mounting elements which are configured as mounting screws extending through a flange of the fastening device.

It is an object of the invention to provide a body structure having a roof rail, wherein the body structure can be used both on a permanently closed vehicle roof and on a vehicle with a sliding roof or panoramic roof and wherein mounting the roof rail is simplified.

SUMMARY OF THE INVENTION

According to the invention, a vehicle body structure having a roof rail is provided. The body structure is formed with first and second side parts and a vehicle roof extending in a horizontal direction therebetween. A fastening device is formed on a lower side of the vehicle roof and acts as a reinforcing element for the vehicle roof. A plurality of hollow rivets extend through the fastening device and the vehicle roof. The roof rail is fastened to the upper side of the vehicle roof via mounting elements in such a way that a threaded section of each mounting element extends through one of the hollow rivets and protrudes out of the respective hollow rivet, and a nut acts on the threaded section of the respective mounting element.

The body structure according to the invention can be used in both permanently closed vehicle roofs and in vehicle roofs with a sliding roof or panoramic roof. Further, the roof rail can be simply mounted on the body structure.

According to one advantageous development of the invention, the respective mounting element is configured as a threaded pin having an upper section engaging a recess of the roof rail in a positively locking manner and a lower threaded section protruding out of the corresponding hollow rivet. The nut bears against the lower threaded section of the mounting element and a lower section of the respective hollow rivet. This refinement of the invention is particularly preferred for ensuring simple and reliable mounting of the roof rail on the vehicle roof of the body structure.

According to a further advantageous development, the roof rail rests over its entire length on an upper side of the vehicle roof. A roof rail formed without rail feet is particularly preferred. Sealing elements are preferably arranged between the roof rail and the upper side of the vehicle roof.

When the vehicle roof is configured as a permanently closed vehicle roof without a sliding roof or panoramic roof, a first flange of the fastening device is fastened to an adjoining section of the underside of the vehicle roof and a second flange of the fastening device is fastened to an adjoining horizontally-extending flange of the side part via a structural adhesive. Furthermore, the side part and the vehicle roof are connected via a laser brazed joint. The hollow rivets which extend through the fastening device and the vehicle roof are connected both to the vehicle roof and to the fastening device in a positively locking manner.

When the vehicle roof has an opening for a sliding roof or panoramic roof, the fastening device is fastened by way of a first horizontally-extending lateral flange which extends in the horizontal direction to the flange of the side part and a second vertically-extending lateral flange to a vertically-extending section of the vehicle roof which delimits the recess for the sliding roof. Recesses are provided in a central section of the fastening device for the passage of the hollow rivets which are connected to the vehicle roof but not to the fastening device.

When the vehicle roof has an opening for a sliding roof or panoramic roof, according to a first variant, a mounting rail is positioned between the central section of the fastening device and the adjoining section of the vehicle roof and connected via a structural adhesive to both the fastening device and to the vehicle roof. The hollow rivets also extend through the mounting rail and are connected to the vehicle roof. According to a second, alternative variant, a central section of the fastening device and the adjoining section of the vehicle roof are connected directly via a structural adhesive between the recesses for the passage of the hollow rivets.

Preferred developments of the invention result from the subclaims and the following description. Exemplary embodiments of the invention will be explained in greater detail, without being restricted thereto, using the drawings.

DETAILED DESCRIPTION

Figure 1:
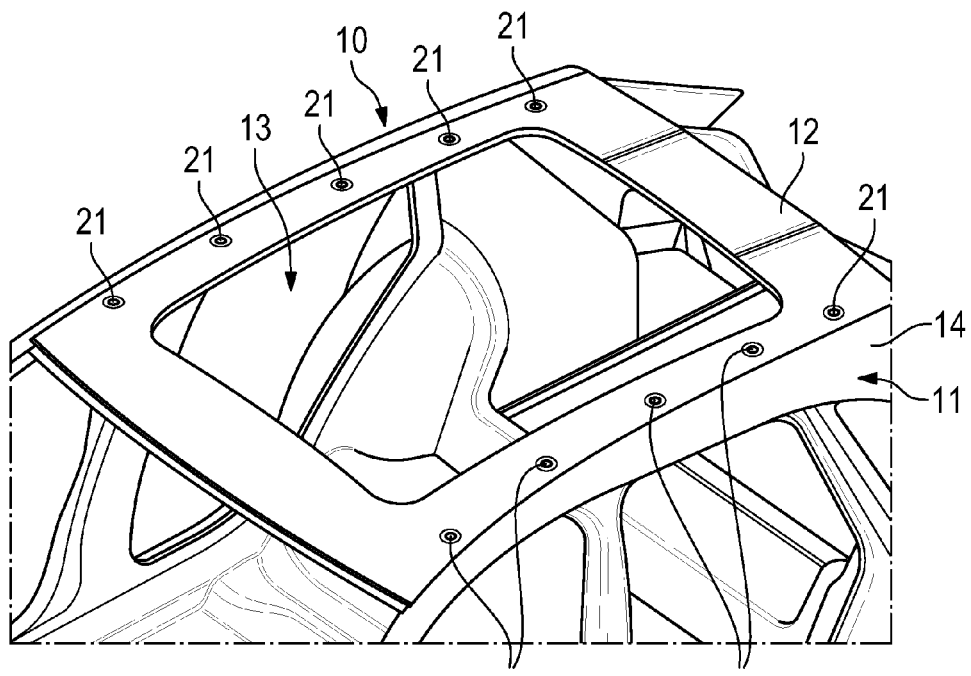
FIG. 1 shows a view from above of a body structure of a motor vehicle having a roof cutout or a recess for a sliding roof or panoramic roof and having fastening points for a roof rail.
Figure 2:
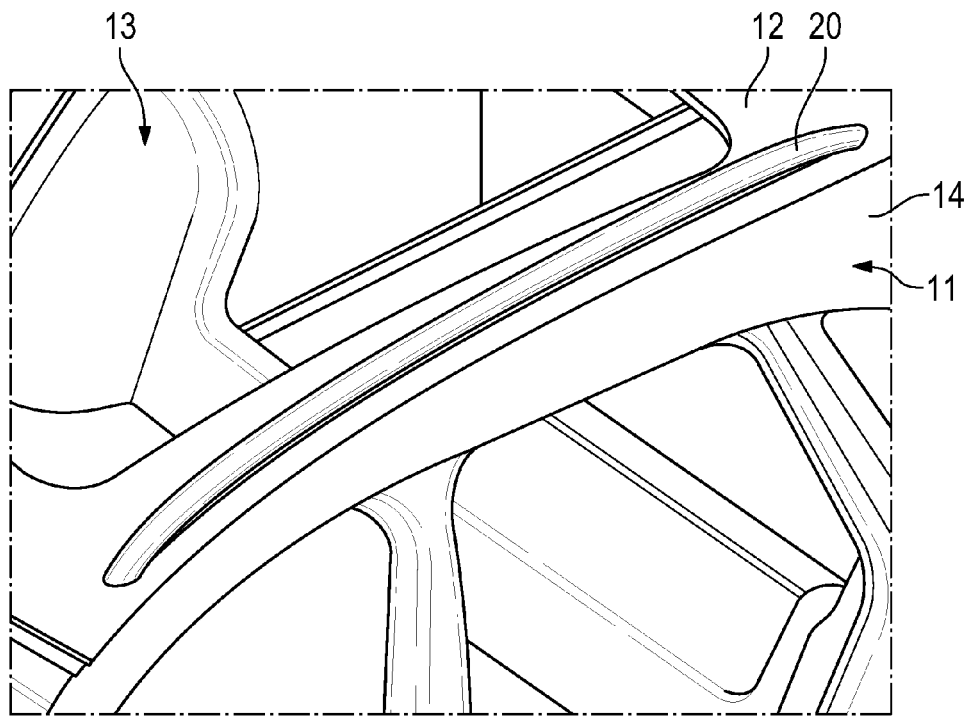
FIG. 2 shows an enlarged view of FIG. 1 with a roof rail which is fastened to the fastening points.
Figure 3:
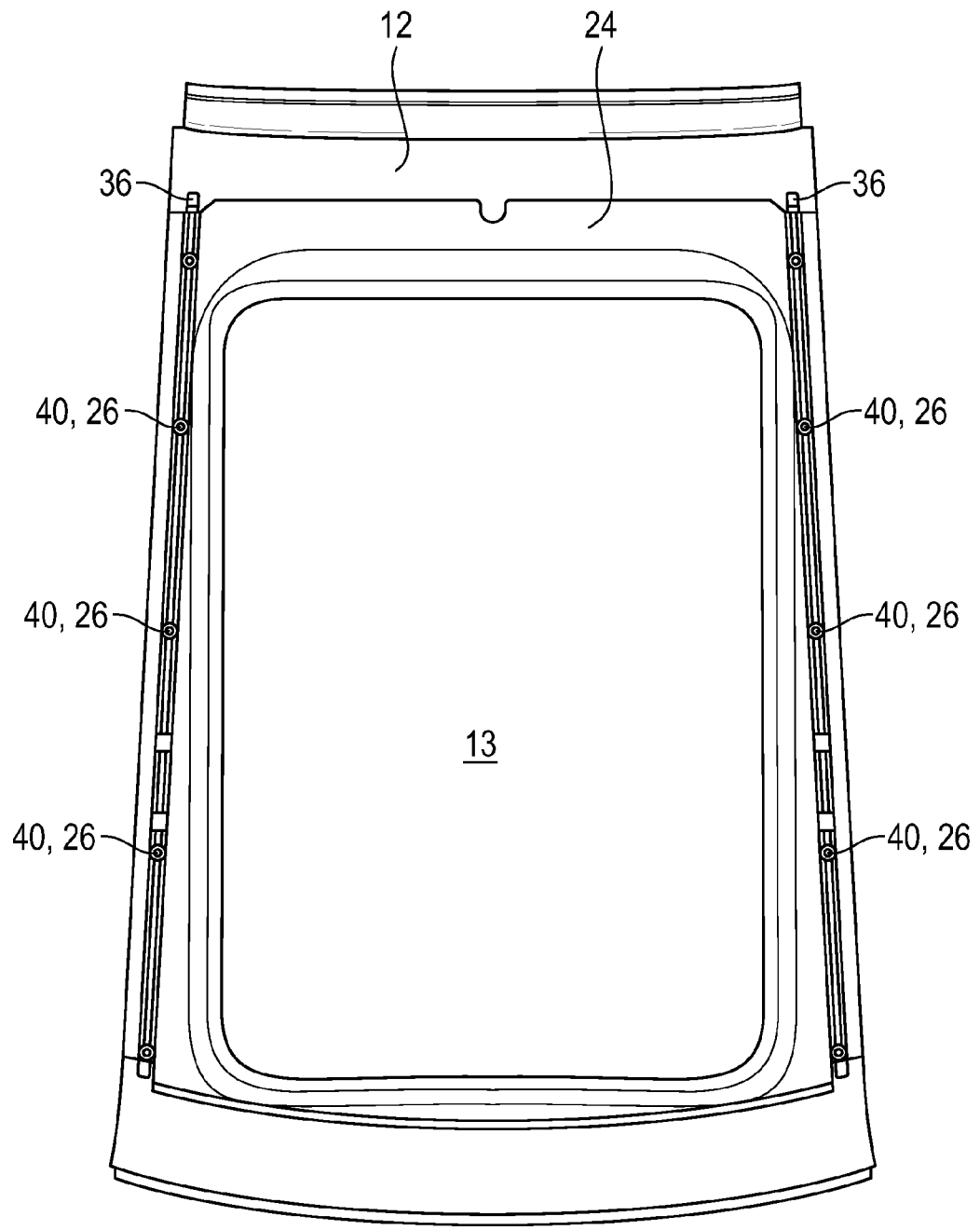
FIG. 3 shows a view from below of a vehicle roof of the body structure of FIGS. 1 and 2.
Figure 4:
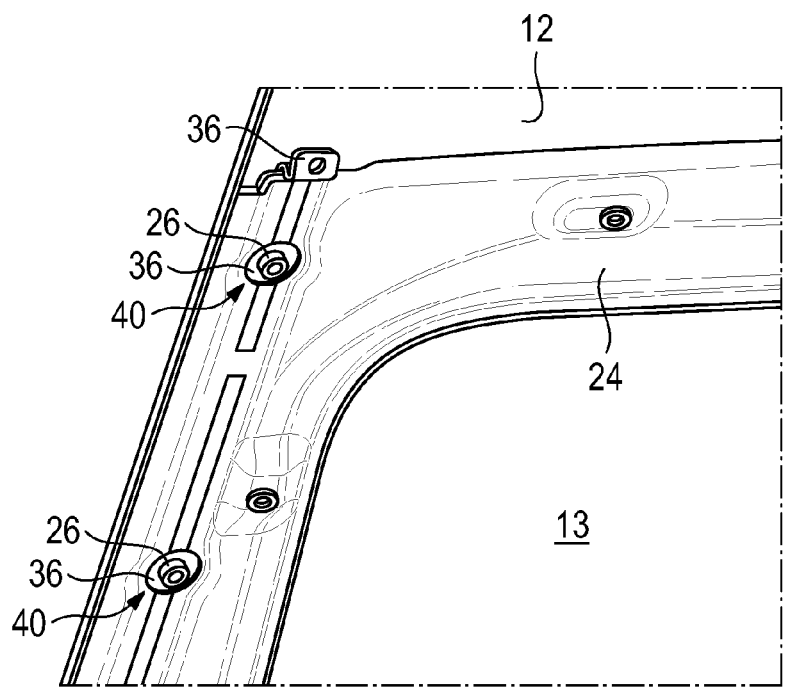
FIG. 4 shows an enlarged detail of FIG. 3.
Figure 5:
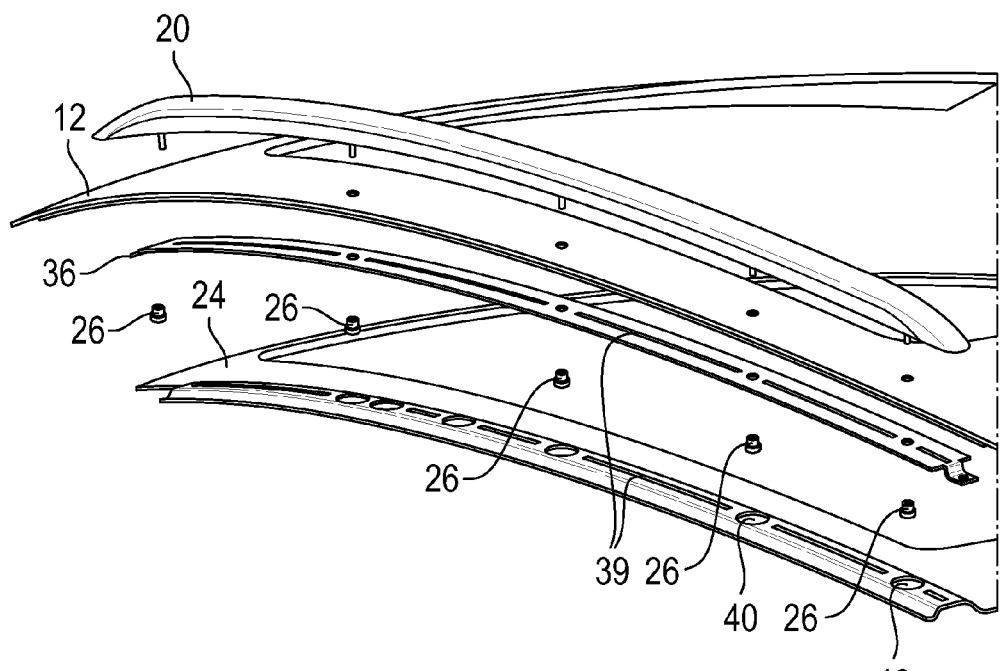
FIG. 5 shows the vehicle roof of FIGS. 3 and 4 in an exploded illustration.
Figure 6:
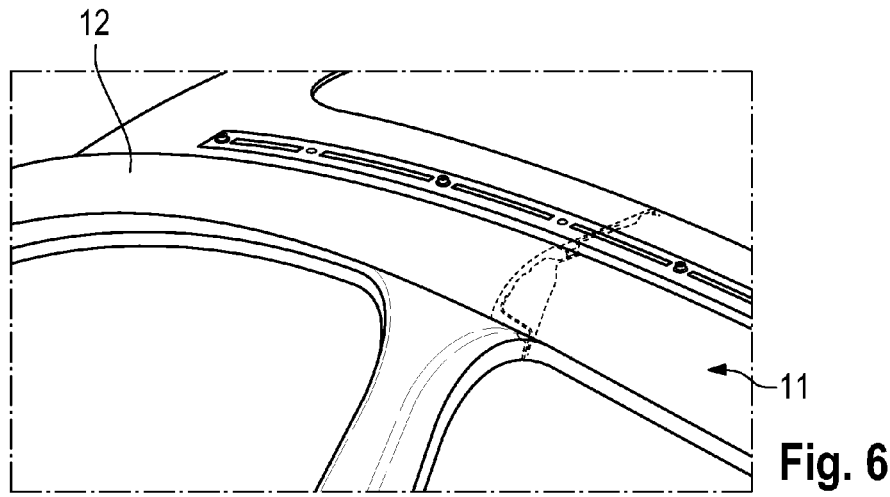
FIG. 6 shows a detail from the body structure of FIGS. 1 and 2 with an indicated section outside the region of a hollow rivet which serves to mount the roof rail.
Figure 7:
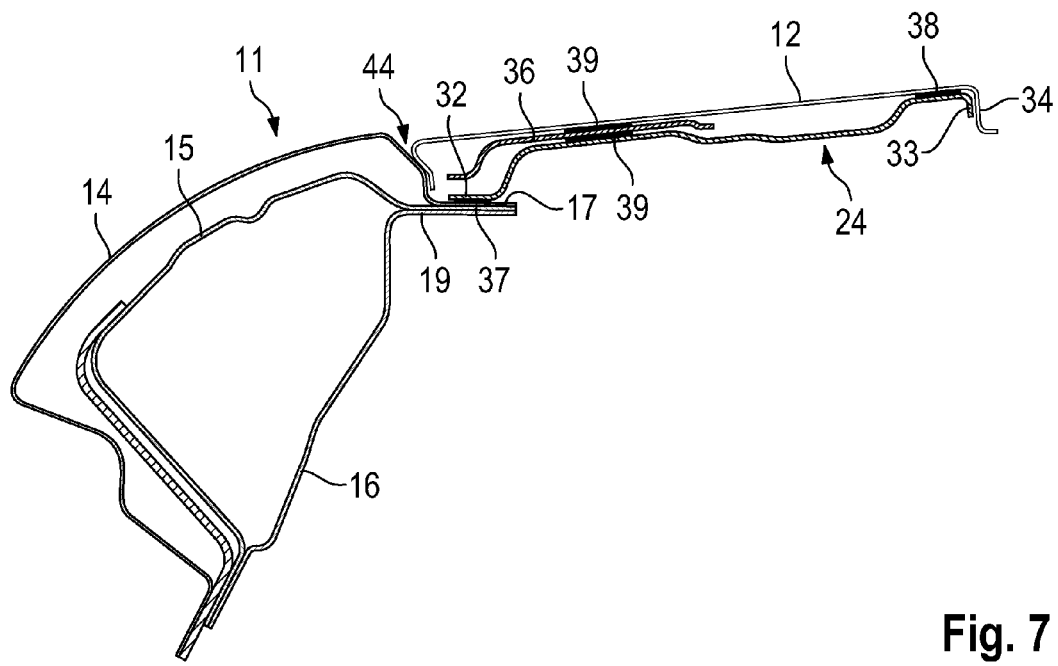
FIG. 7 shows the section of FIG. 6 without a roof rail.
Figure 8:
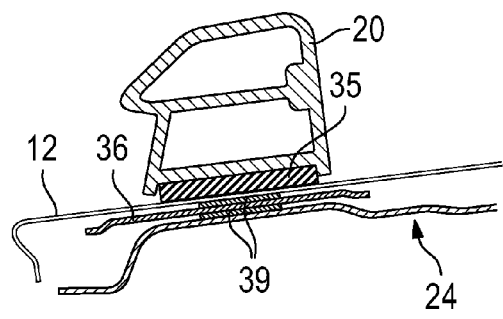
FIG. 8 shows the section of FIG. 6 with a roof rail.
Figure 9:
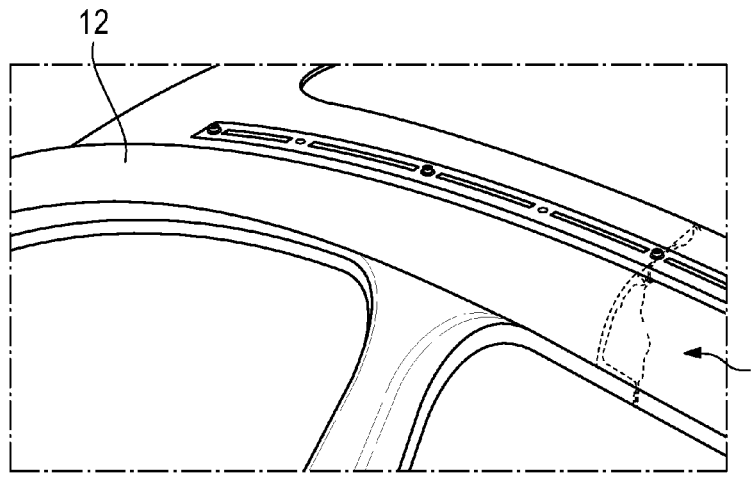
FIG. 9 shows a detail from the body structure of FIGS. 1 and 2 with an indicated section through a hollow rivet which serves to mount the roof rail.
Figure 10:
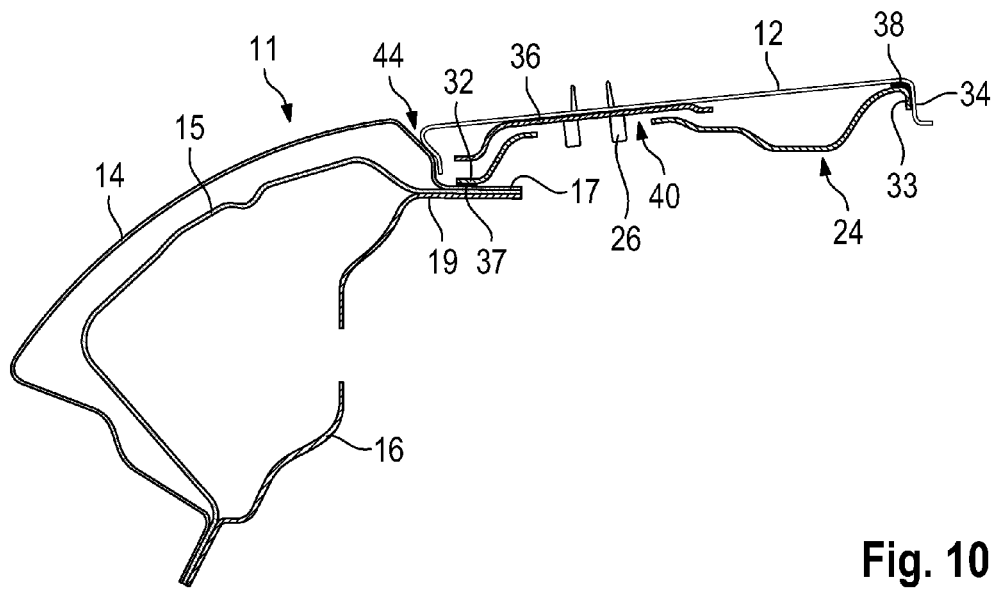
FIG. 10 shows the section of FIG. 9 without a roof rail.
Figure 11:
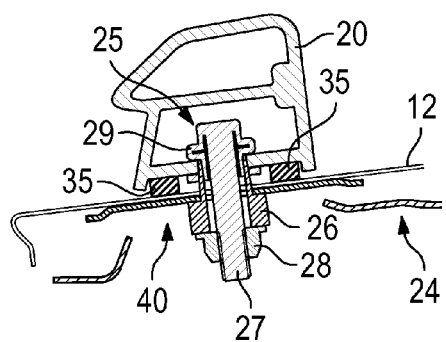
FIG. 11 shows the section in FIG. 10 with a roof rail.
Figure 12:
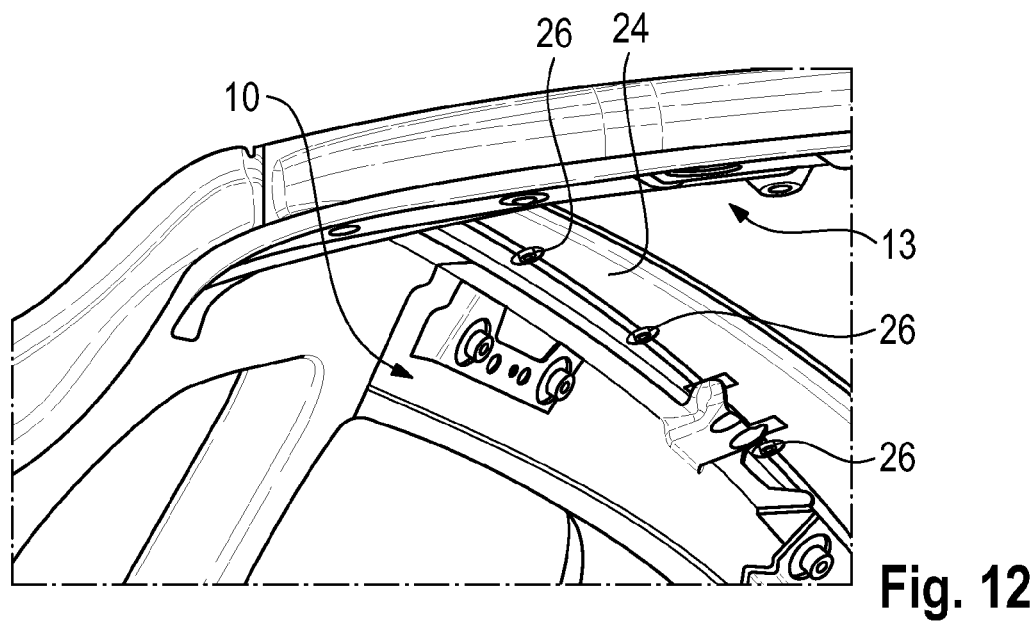
FIG. 12 shows a view of the body structure of FIGS. 1 and 2 from the interior, obliquely upward.

The present invention relates to a body roof structure having a roof rail.

FIGS. 1 to 12 show a first embodiment of a body structure for a motor vehicle, the vehicle roof of which has a sliding roof or panoramic roof.

According to FIGS. 1 to 12, a body structure of a motor vehicle is provided having first and second spaced apart side parts 10, 11, with a substantially horizontal vehicle roof 12 extending therebetween. In the exemplary embodiment of FIGS. 1 to 12, a recess 13 for receiving a sliding roof or panoramic roof 30 is provided in the vehicle roof 12. A vertically extending section 34 of the vehicle roof 12 extends at least partially around the recess 13.

The side part 11 is an assembled side part comprising three side parts, namely an outer side part 14, a central side part 15 and an inner side part 16. Flanges 17, 18 and 19 of the outer side part 14, the central side part 15, and the inner side part 16, respectively, extend in a substantially horizontal direction and are connected to each other. Further, the flanges 17, 18 and 19 adjoin the vehicle roof 12.

The body structure of FIGS. 1 to 12 has first and second roof rails 20 extending in a longitudinal direction of the vehicle roof 12. The first and second roof rails 20 are fastened to an upper side 22 of the vehicle roof 12 at fastening points 21. The first roof rail 20 is fastened at the fastening point 21 between the first side part 10 and the recess 13. The second roof rail 20 is fastened to the fastening point between the second side part 11 and the recess 13.

A fastening device 24 acts on an underside 23 of the vehicle roof 12. The fastening device 24 extends around the recess 13 for the sliding roof 30. The fastening device 24 is configured as a reinforcing element for the vehicle roof 12.

The fastening device 24 of the body structure is formed with a horizontally-extending central section 31, a first horizontally-extending flange 32 projecting from the central section 31 and a second vertically extending flange 33 projecting from the central section 31 opposite the first horizontally-extending flange 32. The first flange 32 is connected to the flange 17 of the outer side part 14 via a structural adhesive 37. The second lateral flange 33 is fastened to the vertically-extending section 34 of the vehicle roof 12 via a structural adhesive 38. Recesses 40 are formed in the fastening device 24 in positions corresponding to the fastening points 21.

In the exemplary embodiment of FIGS. 1 to 12, the first and second roof rails 20 are fastened to the upper side 22 of the vehicle roof 12 of the body structure via a plurality of mounting elements 25. A mounting rail 36 is arranged between the central section 31 of the fastening device 24 and the vehicle roof 12. The mounting rail 36 is connected to both the fastening device 24 and the vehicle roof 12 via a structural adhesive 39. The structural adhesive 39 is preferably provided in the region between the recesses 40 and between the fastening points 21. A plurality of hollow rivets 26 extend through the fastening device 24, the mounting rail 36 and the vehicle roof 12. The hollow rivets 26 are preferably connected in a positively locking manner only to the vehicle roof 12 and the mounting rail 36 but not to the fastening device 24. The hollow rivets 26 extend through the recesses 40 without fastening to the fastening device 24. The mounting elements 25 are configured as threaded pins having a lower threaded section 27 and an upper section 29. The upper section 29 of each mounting element 25 engages a recess of the roof rail 20 in a positively locking manner.

The first and second roof rails 20 are fastened to the upper side 22 of the vehicle roof 12 so that the lower threaded section 27 extends inward through one of the plurality of hollow rivets 26 and protrudes out of the respective hollow rivet 26. A nut 28 acts on the threaded section 27 of the respective mounting element 25 protruding out of the hollow rivet 26 and bears against a lower section of the respective hollow rivet 26.

The roof rail 20 rests over its entire length on the upper side 22 of the vehicle roof. A roof rail 20 without rail feet is particularly preferred. Sealing elements 35 are preferably arranged between the roof rail 20 and the upper side 22 of the vehicle roof 12.

The structural adhesives 37, 38, 39 serves to connect the above components and to provide tolerance compensation between the components to be connected. The respective side part 10, 11 and the vehicle roof 12 are connected, furthermore, via a laser brazed joint 44.

In the exemplary embodiment of FIGS. 1 to 12, the actual mounting of the respective roof rail 20 on the vehicle roof 12 accordingly takes place via the mounting elements 25, via the hollow rivets 26 which interact with the mounting elements 25, and via the mounting rail 36. In a manner which runs parallel to the respective roof rail 20, the mounting rail 36 is positioned between the vehicle roof 12 and the fastening device 24 which serves as reinforcing element.

Figure 13:
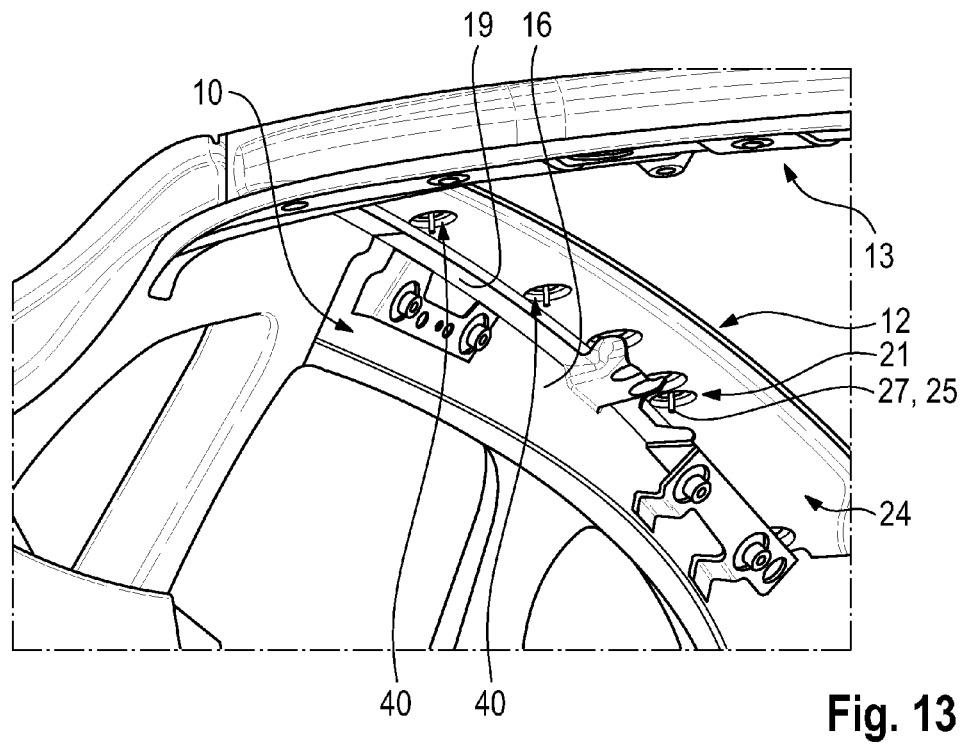
FIG. 13 shows a view which is analogous to FIG. 12 of an alternative body structure of a motor vehicle having a roof cutout or a recess for a sliding roof or panoramic roof.
Figure 14:
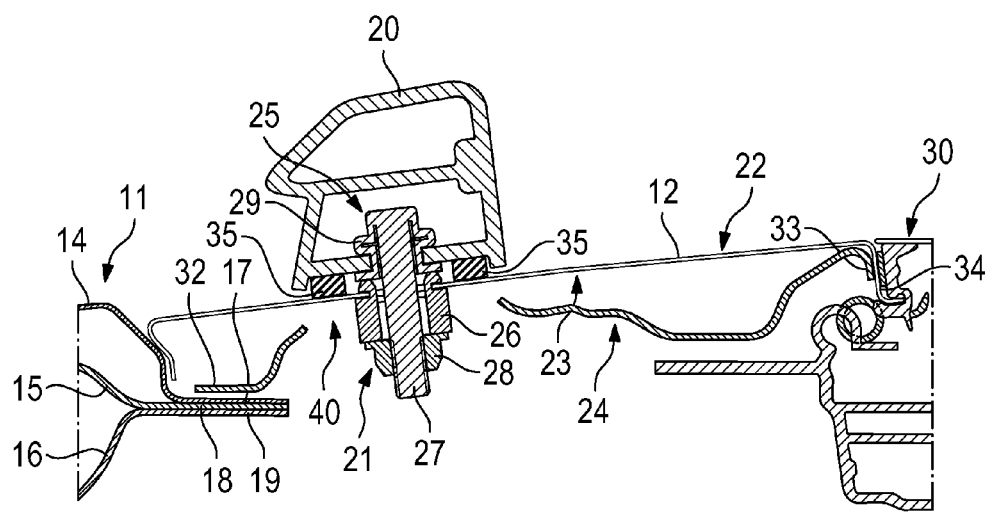
FIG. 14 shows a section which is analogous to FIGS. 10 and 11 through the body structure of FIG. 13.

FIGS. 13 and 14 show a modification of the body structure of FIGS. 1 to 12, the vehicle roof 12 of which has a recess 13 for a sliding roof or panoramic roof. The variant of FIGS. 13 and 14 differs from the exemplary embodiment of FIGS. 1 to 12 substantially in that there is no mounting rail 36 in the exemplary embodiment of FIGS. 13 and 14.

Rather, in the exemplary embodiment of FIGS. 13 and 14, the central section 31 of the fastening device 24 and the adjoining section of the vehicle roof 12 are connected directly via a structural adhesive, namely in the region between the recesses 40 and therefore between the fastening points 21, but not in the region of the recesses 40 or the fastening points 21.

In the variant of FIGS. 13 and 14, the actual mounting of the respective roof rail 20 on the vehicle roof 12 accordingly takes place via the mounting elements 25 and via the hollow rivets 26 which interact with the mounting elements 25, but without the mounting rail.

The hollow rivets 26 are connected to the vehicle roof 12, but not to the fastening device 24. The fastening device 24 is connected to the vehicle roof 12 and the respective side parts 10, 11 and the hollow rivets 26 extend through the recesses 40. Reference is made to the exemplary embodiment of FIGS. 1 to 12 with regard to the remaining details.

The invention can also be used on a body structure, the vehicle roof of which is permanently closed and accordingly does not have a sliding roof. FIGS. 15 to 27 show details of a body structure having a vehicle roof 12 without a sliding roof. Only those details which differ from the exemplary embodiments of FIGS. 1 to 14 are described in the following text in order to avoid unnecessary repetitions. Identical designations are used for identical modules of the exemplary embodiment in order to avoid unnecessary repetitions.

Figure 15:
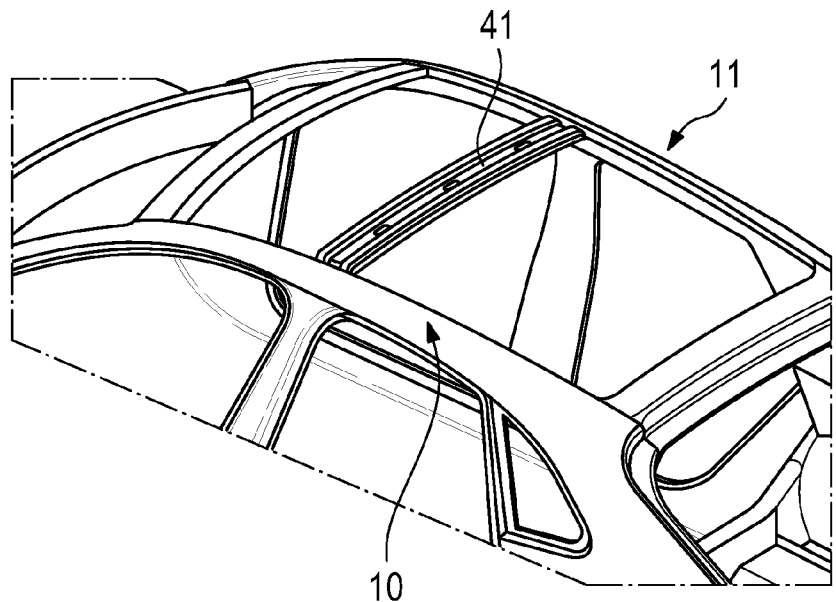
FIG. 15 shows a body structure of a motor vehicle without a roof cutout or a recess for a sliding roof or panoramic roof with the vehicle roof lifted off.
Figure 16:
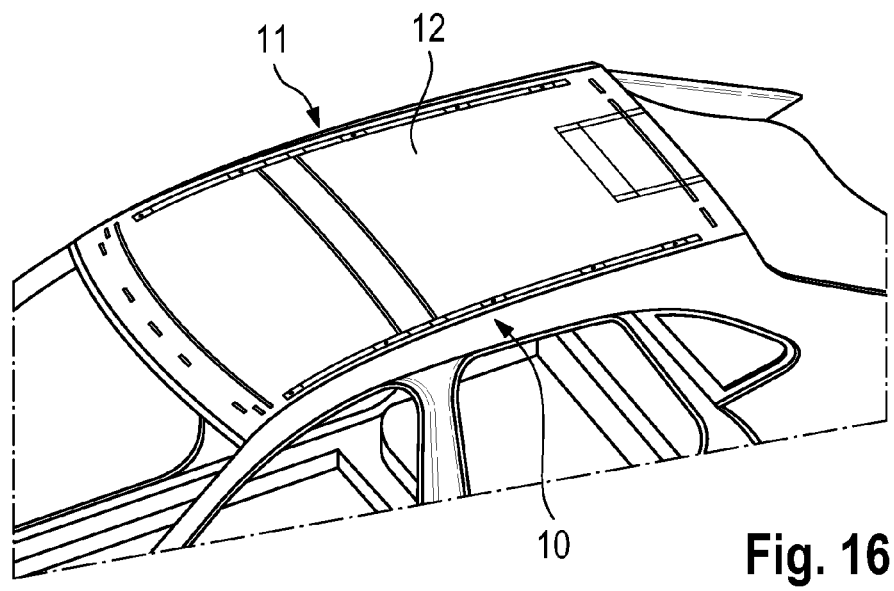
FIG. 16 shows the body structure of FIG. 15 with a vehicle roof.
Figure 17:
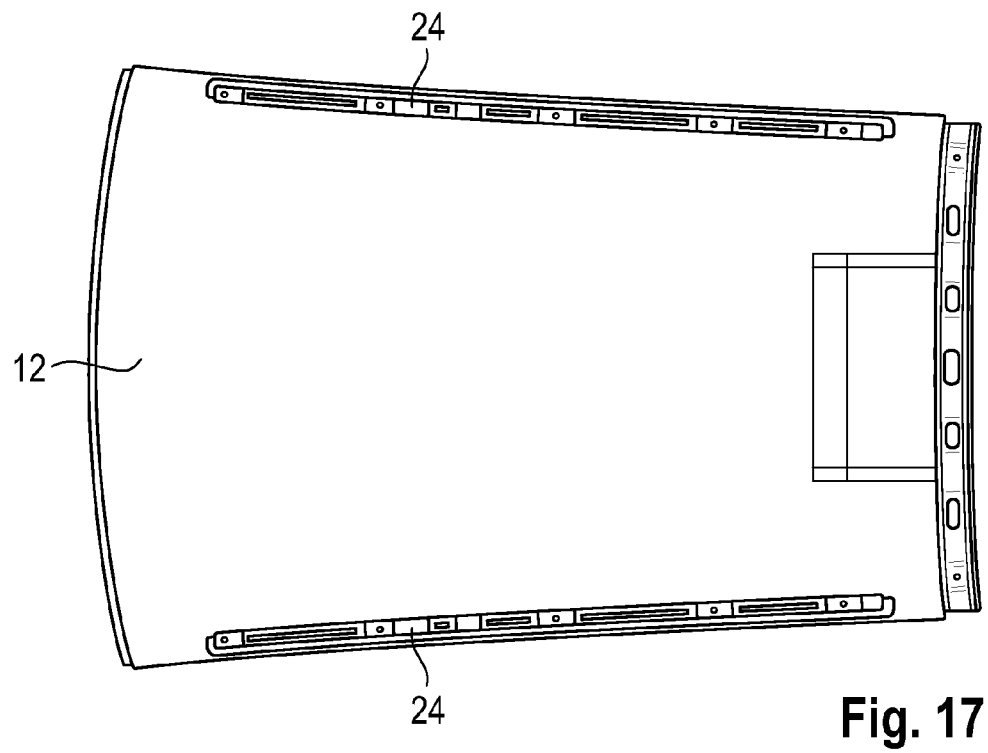
FIG. 17 shows the vehicle roof of FIG. 15 on its own in a view from below.
Figure 18:
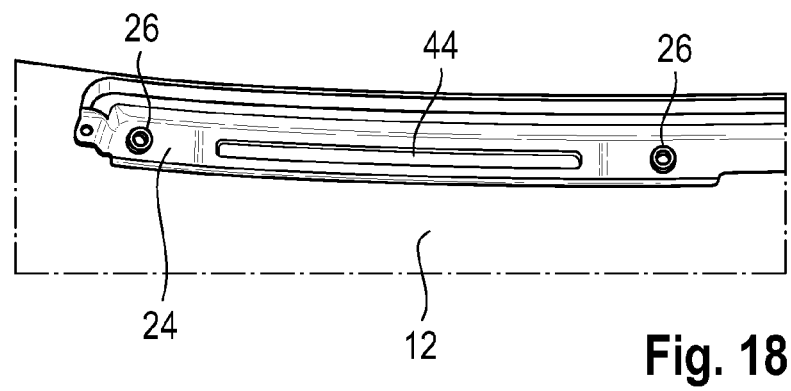
FIG. 18 shows an enlarged detail of FIG. 7.
Figure 19:
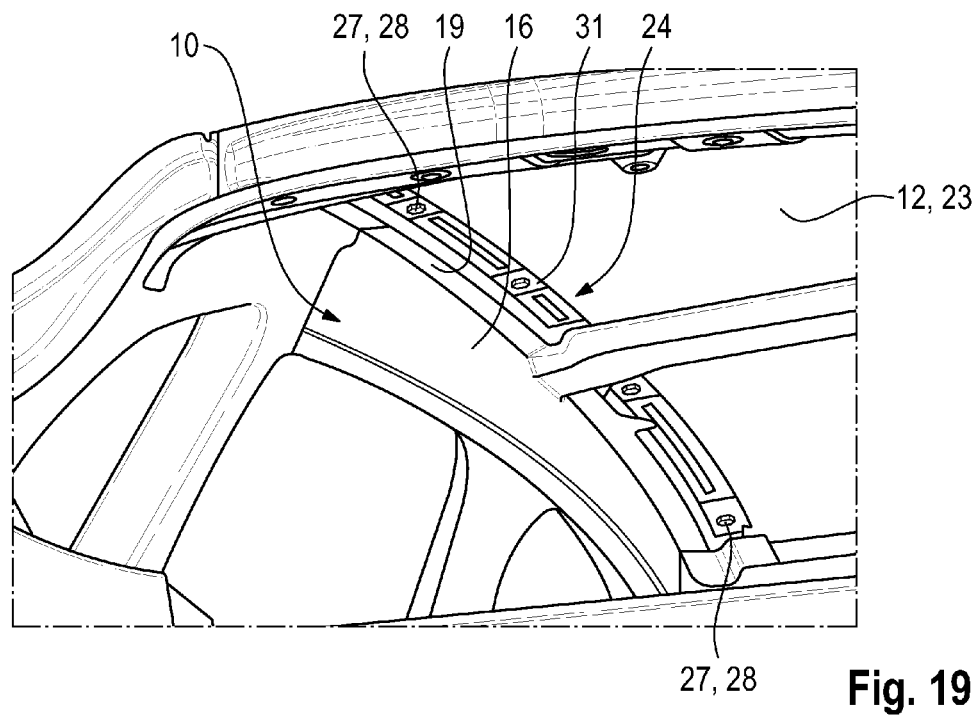
FIG. 19 shows a view of the body structure of FIGS. 15 to 17 in an analogous manner to FIGS. 12 and 13.
Figure 20:
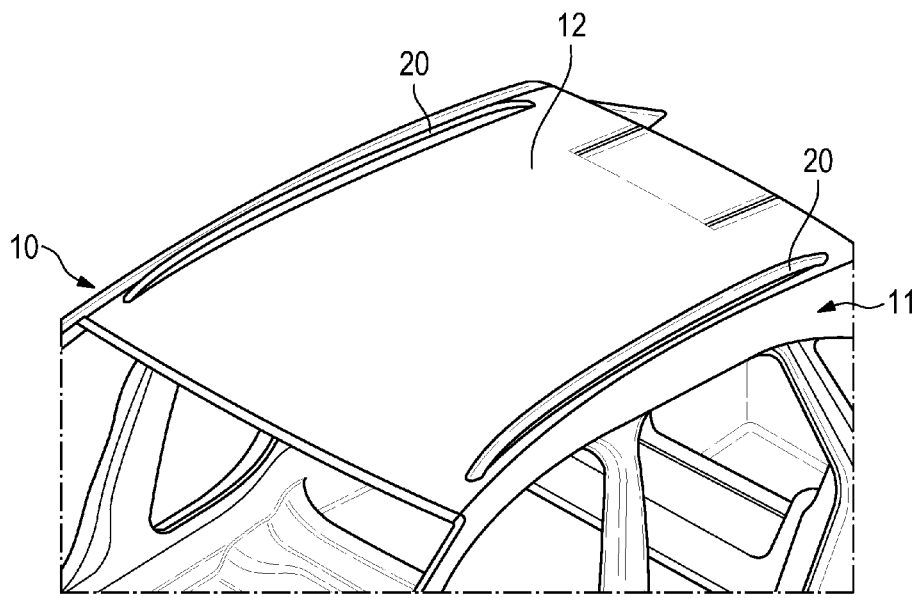
FIG. 20 shows a view from above of the body structure of FIGS. 15 to 19 with a fastened roof rail.
Figure 21:
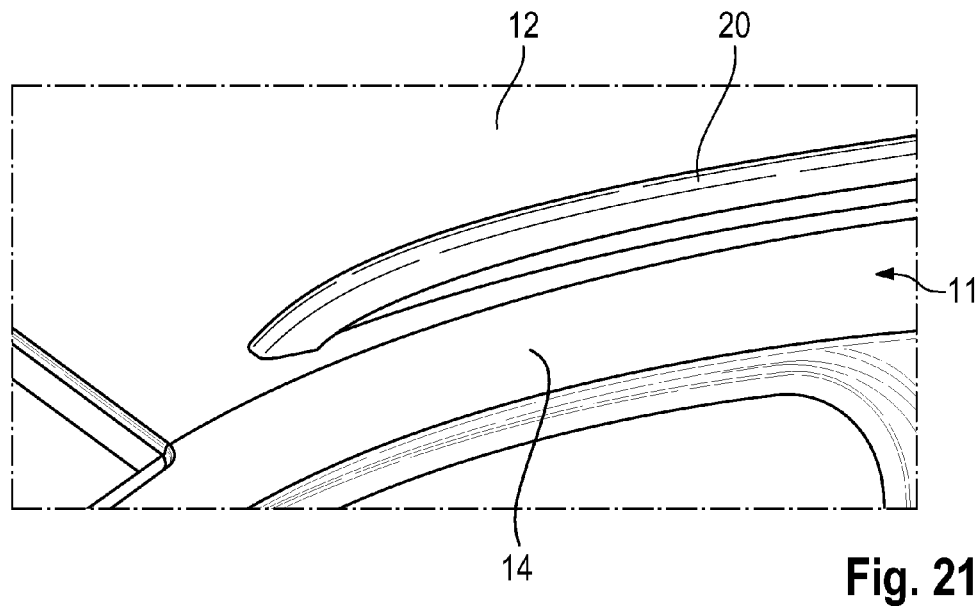
FIG. 21 shows an enlarged detail of FIG. 20.
Figure 22:
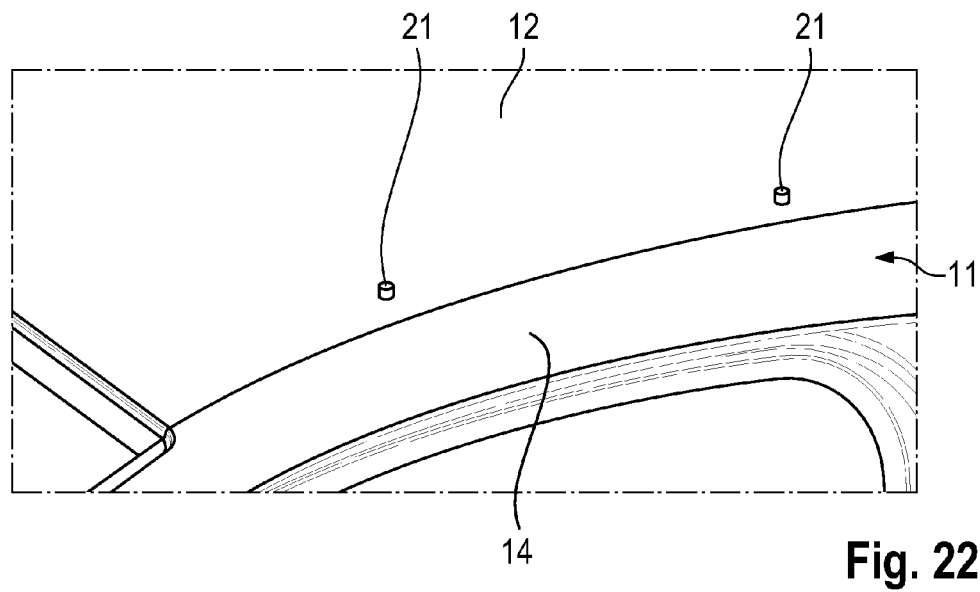
FIG. 22 shows the illustration in FIG. 21 without a roof rail.
Figure 23:
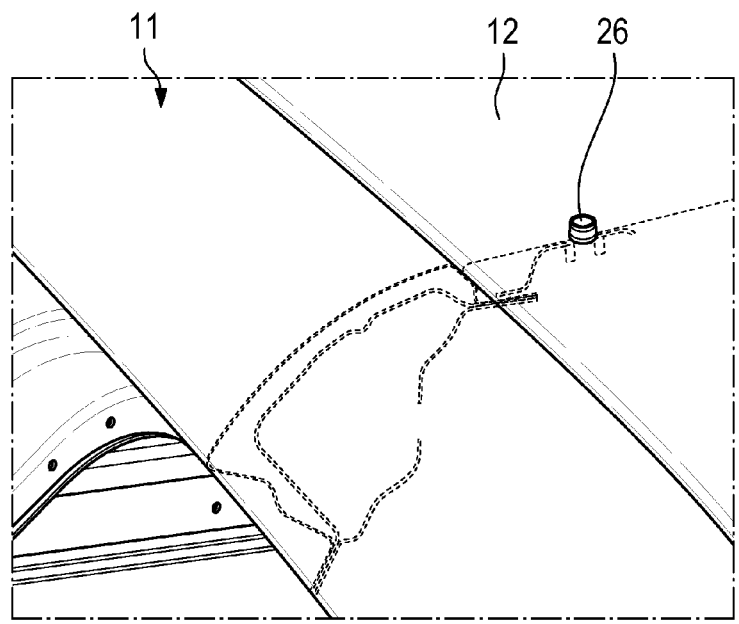
FIG. 23 shows a detail from the body structure of FIGS. 15 to 22 with an indicated section through a hollow rivet which serves to mount the roof rail.
Figure 24:
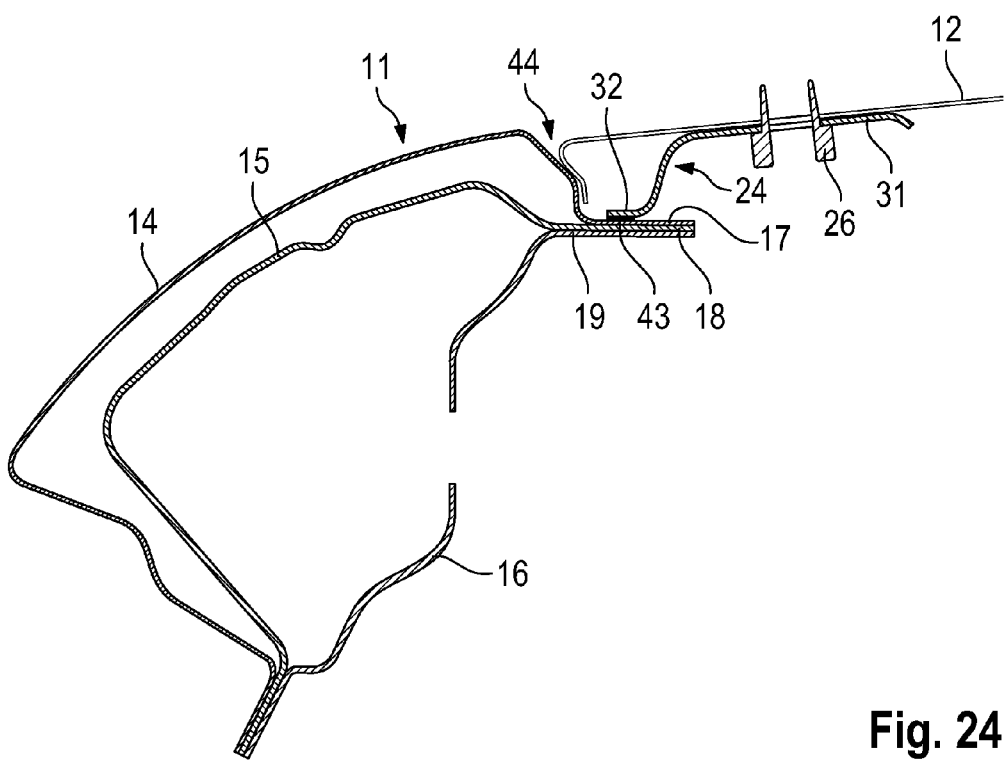
FIG. 24 shows the section of FIG. 23 without a roof rail.
Figure 25:
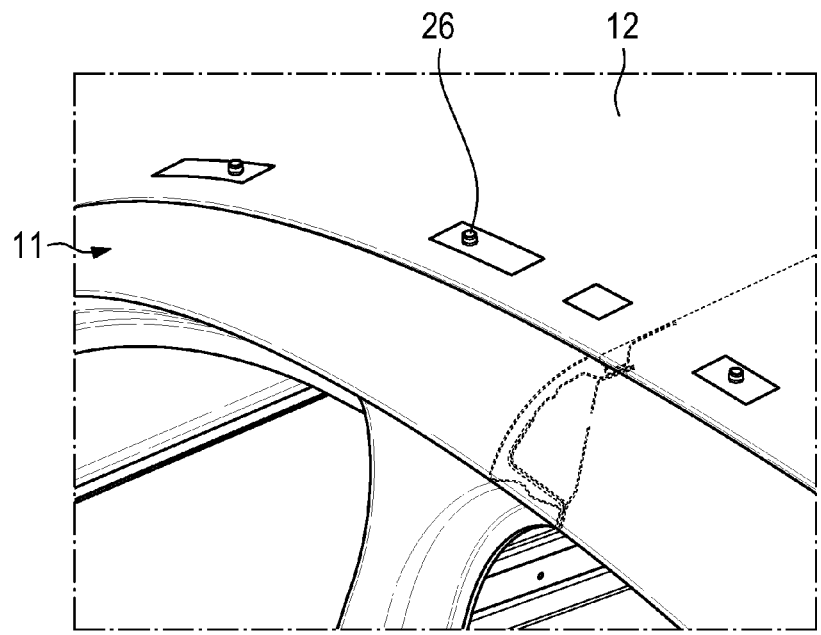
FIG. 25 shows a detail from the body structure of FIGS. 15 to 22 with an indicated section outside the region of a hollow rivet which serves to mount the roof rail.
Figure 26:
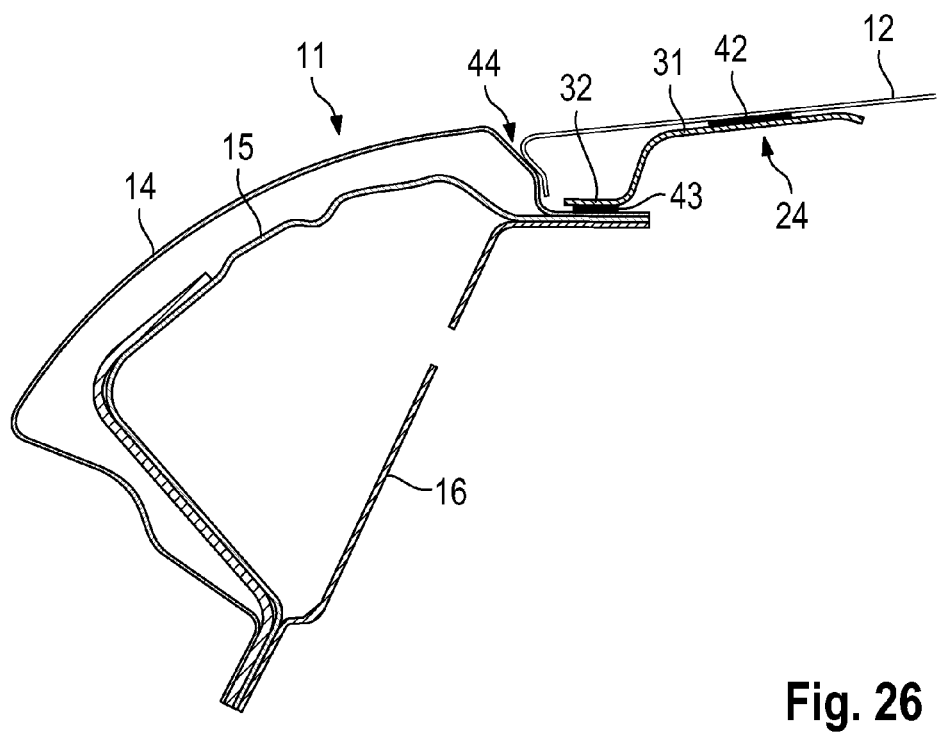
FIG. 26 shows the section of FIG. 25 without a roof rail.
Figure 27:
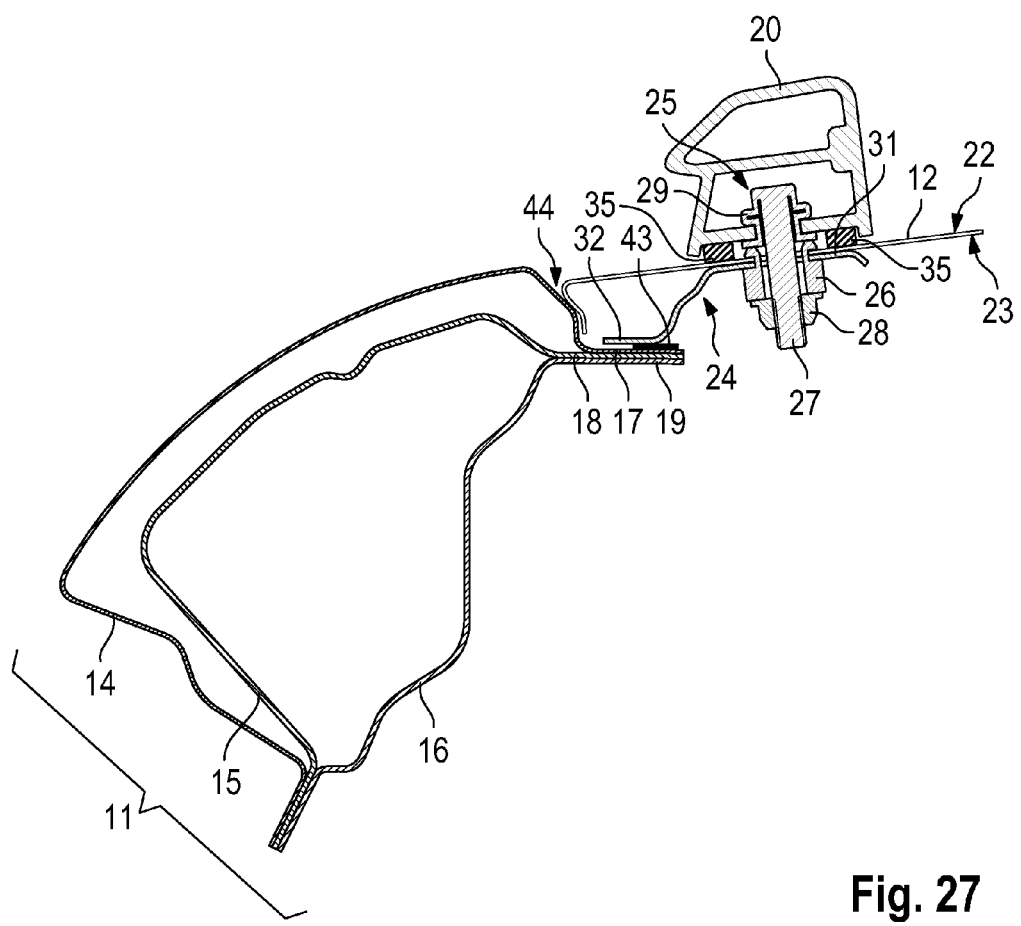
FIG. 27 shows the section in FIG. 23 with a roof rail.

FIG. 15 shows the body structure with the vehicle roof 12 removed and provides an unimpeded view of a crossmember 41, on which the vehicle roof 12 rests in the mounted state.

In the exemplary embodiment of FIGS. 15 to 27, the fastening device 24 which forms a reinforcing element for the vehicle roof 12 is not configured as a reinforcing frame, but rather comprises first and second reinforcing rails which extend parallel to the respective first and second roof rails 20 mounted on the upper side 22 of the vehicle roof 12. The reinforcing rails of the fastening device 24 are fastened by way of a first flange 32a which extends in the horizontal direction to the flange 17 and a second flange 33a which extends in the horizontal direction to the underside 23 of the vehicle roof 12.

The second flange 33a of the fastening device 24 or the respective reinforcing rail is connected to the adjoining section of the vehicle roof 12 via a structural adhesive 42, the first flange 32a of the fastening device 24 or the respective reinforcing rail being connected to the adjoining flange 17 of the respective side part 10, 11 via a structural adhesive 43, to be precise in regions of beads 44 which extend between adjacent hollow rivets 26 and fastening points 21 which are adjacent to the hollow rivets 26, but not in the region of the hollow rivets 26 or the fastening points 21. The respective side part 10, 11 and the vehicle roof are connected, furthermore, via a laser brazed joint 44.

The structural adhesive 42, 43 serves to connect the above components and to provide tolerance compensation between the components to be connected.

The hollow rivets 26 extend through the second flange 33a of the fastening device 24 and through an adjoining section of the vehicle roof 12 and are connected thereto.

With regard to the remaining details, the exemplary embodiment of FIGS. 15 to 27 corresponds to the exemplary embodiments of FIGS. 1 to 14, with the result that reference is made to the embodiments with respect to FIGS. 1 to 14.

What is claimed is:

1. A body structure of a motor vehicle, having a side part, having a vehicle roof, having a fastening device which acts on an underside of the vehicle roof, and having a roof rail which is mounted on an upper side of the vehicle roof via a plurality of mounting elements, characterized in that
a plurality of hollow rivets extend through the fastening device, which is configured as a reinforcing element for the vehicle roof, and the vehicle roof;
the roof rail is fastened to the upper side of the vehicle roof via the mounting elements in such a way that a threaded section of each mounting element extends through in each case one of the hollow rivets and protrudes out of the respective hollow rivet, a nut acting on that threaded section of the respective mounting element which protrudes out of the hollow rivet.

2. The body structure as claimed in claim 1, characterized in that the respective nut bears against a lower section of the respective hollow rivet.

3. The body structure as claimed in claim 1, characterized in that the respective mounting element is configured as a threaded pin which engages with an upper section into a recess of the roof rail in a positively locking manner.

4. The body structure as claimed in claim 1, characterized in that the roof rail rests over its entire length on the upper side of the vehicle roof.

5. The body structure as claimed in claim 1, characterized in that sealing elements are arranged between the roof rail and the upper side of the vehicle roof.

6. The body structure as claimed in claim 1, characterized in that the vehicle roof is configured as a permanently closed vehicle roof, the fastening device being fastened by way of a first flange which extends in the horizontal direction to the underside of the vehicle roof which extends in the horizontal direction, and the fastening device being fastened by way of a second flange which extends in the horizontal direction to a flange of the side part, which flange extends in the horizontal direction.

7. The body structure as claimed in claim 6, characterized in that the first flange of the fastening device is connected to an adjoining section of the vehicle roof via a structural adhesive, in that the second flange of the fastening device is connected to the adjoining flange of the side part via a structural adhesive, and in that, furthermore, the side part and the vehicle roof are connected via a laser brazed joint.

8. The body structure as claimed in claim 6, characterized in that the hollow rivets which extend through the fastening device and the vehicle roof are connected both to the vehicle roof and to the fastening device.

9. The body structure as claimed in claim 1, characterized in that the vehicle roof has an opening for a sliding roof or panoramic roof, the fastening device being fastened by way of a first lateral flange which extends in the horizontal direction to a flange of the side part, which flange extends in the horizontal direction, the fastening device being fastened by way of a second lateral flange which extends in the vertical direction to a section of the vehicle roof, which section extends in the vertical direction and delimits the recess for the sliding roof, and the fastening device having recesses in a central section for the passage of the hollow rivets which are connected to the vehicle roof but not to the fastening device.

10. The body structure as claimed in claim 9, characterized in that a mounting rail is positioned between the central section of the fastening device and the adjoining section of the vehicle roof, which mounting rail is connected via a structural adhesive both to the fastening device and to the vehicle roof, the hollow rivets also extending through the mounting rail and being connected to the latter.

11. The body structure as claimed in claim 9, characterized in that the central section of the fastening device and the adjoining section of the vehicle roof are connected via a structural adhesive between the recesses for the passage of the hollow rivets.

12. A body structure of a motor vehicle having a roof rack, comprising:
first and second spaced apart side parts;
a vehicle roof extending between the first and second side parts having opposite upper and lower surfaces;
a fastening device provided on the lower surface of the vehicle roof;
at least one hollow rivet extending through the fastening device and the vehicle roof;

at least one mounting element configured to extend through the at least one hollow rivet, the at least one mounting element having an upper section and a lower threaded section; and at least one nut configured to engage the lower threaded section of the at least one mounting element, wherein the roof rail is mounted to the upper surface of the vehicle roof and fastened to the vehicle roof via the at least one mounting element, and the lower threaded section of the at least one mounting element extends through the at least one hollow rivet and engages the at least one nut.

13. The body structure of a motor vehicle of claim 1, wherein the at least one nut bears against a lower section of the at least one hollow rivet.

14. The body structure of a motor vehicle of claim 12, wherein the at least one mounting element is a threaded pin, and the upper section engages a recess of the roof rail in a positively locking manner.

15. The body structure of a motor vehicle of claim 12, wherein the vehicle roof is configured as a permanently closed vehicle roof and the fastening device is fastened by way of a first flange connected to the lower surface of the vehicle roof and a second flange to a side part flange extending from the side part.

16. The body structure of a motor vehicle of claim 15, wherein the first flange is connected to an adjoining section of the vehicle roof via a first structural adhesive, the second flange is connected to the side part flange via a second structural adhesive, and the first and second side parts are connected to the vehicle roof via a laser brazed joint.

17. The body structure of a motor vehicle of claim 12, wherein the vehicle roof is formed with a recess configured to accommodate a sliding roof or panoramic roof and a vertically-projecting section extending peripherally around the recess, and the fastening device is fastened by way of a first horizontally-extending lateral flange connected to a flange of the side part and a second vertically-extending lateral flange connected to the vertically-projecting section of the vehicle roof.

18. The body structure of a motor vehicle of claim 12, further comprising:

a mounting rail positioned between the fastening device and the vehicle roof, wherein the mounting rail is connected to the fastening device and the vehicle roof by a structural adhesive, and the at least one hollow rivet extends through the mounting rail.

19. The body structure of a motor vehicle of claim 12, wherein the roof rail rests over its entire length on the upper surface of the vehicle roof.

20. The body structure of a motor vehicle of claim 12, wherein sealing elements are arranged between the roof rail and the upper surface of the vehicle roof.

\* \* \* \* \*